United States Patent
Borer et al.

[11] Patent Number: 5,784,114
[45] Date of Patent: Jul. 21, 1998

[54] MOTION COMPENSATED VIDEO PROCESSING

[76] Inventors: Timothy John Borer, 86 Allingham Road, Reigate, Surrey GU9 OLA; Philip David Martin, 19A Fyfield Road, Enfield, Middlesex EN1 3TT; David Lyon, 20 Alma Lane, Heath End, Farnham, Surrey GU9 OLA, all of England

[21] Appl. No.: 362,563
[22] PCT Filed: Jul. 5, 1993
[86] PCT No.: PCT/GB93/01404
§ 371 Date: Jun. 28, 1995
§ 102(e) Date: Jun. 28, 1995
[87] PCT Pub. No.: WO94/01970
PCT Pub. Date: Jan. 20, 1994

[30] Foreign Application Priority Data

Jul. 3, 1992 [GB] United Kingdom .................. 9214218

[51] Int. Cl.$^6$ .................................... H04N 7/01
[52] U.S. Cl. .................. 348/452; 348/448; 348/443
[58] Field of Search .................. 348/441, 451, 348/452, 620, 699, 700, 701, 431, 443, 458, 459, 454, 453, 444; H04N 5/14, 9/64, 7/01

[56] References Cited

U.S. PATENT DOCUMENTS

| | | | |
|---|---|---|---|
| 4,691,230 | 9/1987 | Kaneko et al. | 348/699 |
| 5,045,939 | 9/1991 | Okayama et al. | 348/700 |

FOREIGN PATENT DOCUMENTS

| | | |
|---|---|---|
| 0 294 958 | 12/1988 | European Pat. Off. |
| 0 341 769 | 11/1989 | European Pat. Off. |
| 0 478 217 | 4/1992 | European Pat. Off. |
| 0 514 012 | 11/1992 | European Pat. Off. |
| 90/03705 | 4/1990 | WIPO. |
| 92/21201 | 11/1992 | WIPO. |

Primary Examiner—Michael H. Lee

[57] ABSTRACT

Method of motion-compensated video processing such as standards conversion, uses motion vectors assigned on a pixel-by-pixel basis. The pixels of an input video signal are written to locations in a video store determined by the motion vector assigned to that pixel. Multiple vectors can address a single written pixel to enable mixing of backward and forward vectors. A confidence value governs the accumulation of pixels and the later interpolation between motion compensated fields.

13 Claims, 9 Drawing Sheets

MOTION COMPENSATED VIDEO PROCESSING

BACKGROUND OF THE INVENTION

This invention relates to video processing techniques and apparatus in which use is made of the measured motion in sequences of video images. In an important example, the invention relates to motion compensated standards conversion.

Standards conversion is the process of converting television signals between different scanning standards, particularly between European (PAL) and American (NTSC) television signals. The present invention, in this aspect, is concerned with the temporal interpolation of fields at new instants of time, rather than colour encoding and deciding which is also required for standards conversion. The description below describes processing of luminance signals; processing of the colour signals is performed in parallel in a similar manner.

Standards conversion is conventionally performed using linear filtering techniques. The techniques are, essentially, the application of a linear, vertical-temporal filter to the television signal. The quality of the conversion process, using this technique, is critically dependant on the details of the interpolation aperture (filter coefficients) which is used. The design of the filter aperture is a compromise between removing aliasing in the signal, which produces undesirable artifacts such as judder and flicker, and removing detail or blurring moving images. Although acceptable results can be achieved with this technique, the results are a compromise and picture artifacts, such as judder or blurring, can easily be seen on some types of pictures.

To avoid the problems inherent in conventional standards conversion the technique of motion compensated interpolation has been suggested. This uses information of the apparent movement of objects in television scenes to improve the conversion process.

If motion compensation can be achieved it largely eliminates the aliasing impairments which are unavoidable in conventionally standards converted pictures. Since the aliasing impairments are avoided there is no need to compromise the filter coefficients used for interpolation. Therefore, in addition to giving a picture which is free from alias impairments, the use of motion compensation allows much more of the resolution, present in the original pictures, to be retained following standards conversion.

It is an object of one aspect of this invention to provide high quality motion compensated interpolation for standards conversion. The invention is concerned in this respect with the manner in which motion vectors are used for improved interpolation of images, rather than the measurement of apparent motion in television picture. There are many known ways in which motion can be measured and suitable motion vectors fields can be derived for use with this invention.

The process of motion compensated standards conversion is, essentially, that of interpolation along the motion trajectory. The assumptions behind this type of motion compensated interpolation are that the scene comprises a number of linearly translating rigid objects. This simple model is adequate for most areas of the picture. It breaks down, however, in regions of revealed or obscured background. Care must be taken, in dealing with these areas of the image, as they can have a disproportionate effect on the overall quality of the interpolated pictures.

In order to perform motion compensated interpolation, it is necessary to displace the image of objects in the input pictures to the appropriate position in the output picture. This is achieved with the aid of what may be called a 'picture shifter'. The picture shifter restructures the input image so that all the objects within it are moved to their correct position in the output image. These motion compensated input fields, can then be combined to produce an output image. By this method an output picture is produced in which there is only one, correctly positioned, image for each object. Conventional standards conversion, by contrast, generates an output picture with multiple images of each object, none of which are in the correct position.

The picture shifting function, in motion compensated systems, is often performed by using a variable delay. In a raster scanned television system the introduction of a delay in the signal path produces a spatial shift in the image. Small delays give horizontal shifts while delay, by a multiple of the number of pixels in a line, gives a vertical shift. Any spatial displacement can be produced by introducing the correct delay. By introducing a variable delay a mechanism is provided for dynamically shifting the position of objects within an image.

In a known motion compensated standards converter, using for example four field stores, the information needed in field interpolation to generate a pixel in output field, is read from the four input fields using the motion vector (delay) associated with that pixel. This means of course that the motion vectors must have first been converted to the new standard. Problems are likely to arise with revealed or obscured background and further processing may be required to avoid objectionable artifacts.

SUMMARY OF THE INVENTION

It is an object of the present invention to provide an improved method of motion compensated video processing—for example standards conversion which is capable of providing high quality output without undue complexity.

Accordingly, the present invention consists in one aspect in a method of motion-compensated video processing utilising motion vectors assigned substantially on a pixel-by-pixel basis, wherein pixels of an input video signal are written to locations in a video store determined by the motion vector assigned to that pixel.

Advantageously, a confidence level is derived for each motion vector.

Preferably, pixels are accumulated with a weighting determined by the confidence level of the motion vector controlling the address to which the respective pixel is written.

Suitably, each motion vector is scaled in relation to the confidence level.

In still a further aspect, the present invention consists in a method of motion-compensated video processing in which an interlace to sequential conversion is conducted prior to motion compensation.

In standards conversion, the approach according to this invention has the important advantage that no standards conversion of the motion vectors is required. Equally important is the fact that for a specific output pixel there is not just one motion vector. As will be more fully explained, the constraint in prior motion compensated standards conversion that a single motion vector is applied to each output pixel has significant disadvantages if background is obscured or revealed during the interval over which temporal interpolation is conducted. In the known system, the same motion vector is applied to both foreground and background. The present invention enables the foreground and background to be assigned different motion vectors. If appropriate a blend of foreground and background can be conducted. This has the important advantage of removing the "cut-out" appearance of moving objects in prior art systems where a choice is made between background and foreground about the perimeter of an object which often will not have a clean edge.

If there is a pixel to which no information is written, the present invention contemplates marking the pixel with a "hole" flag. The hole can then be filled at the appropriate stage by interpolation from surrounding pixels.

BRIEF DESCRIPTION OF THE DRAWINGS

The present invention will now be described by way of example with reference to the accompanying drawings in which.

DESCRIPTION OF THE PREFERRED EMBODIMENTS

Figure 2:
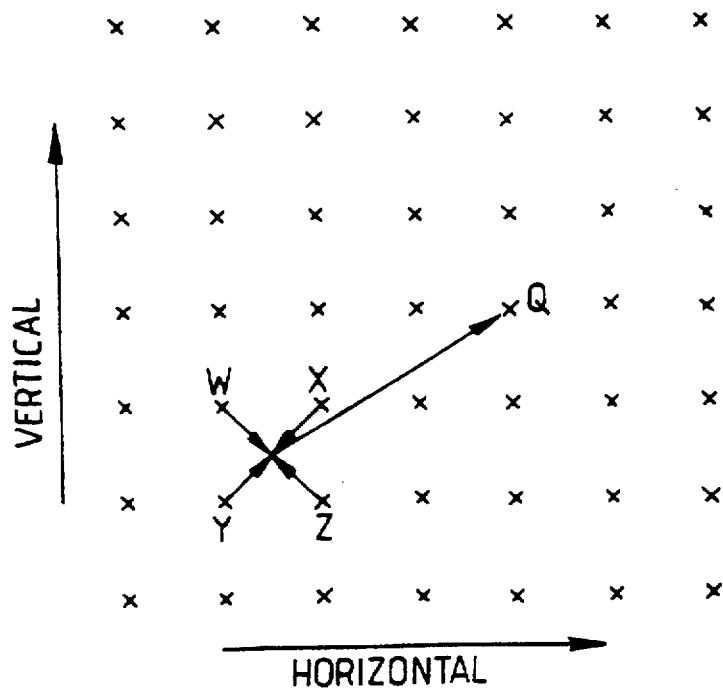
FIG. 2 is a diagram illustrating how sub-pixel displacements can be accommodated.

It has been explained that the function of a picture shifter can be performed by a variable delay. The read pointer is incremented regularly, every clock cycle, and the write pointer is varied according to the motion vector. For a constant delay the read pointer is the write pointer minus n/2, where n is the number of samples. If the motion vector is added to the write pointer the effect on the image is to 'project' it forward (in time) along the motion trajectory. Similarly, if the motion vector is subtracted from the write pointer the image is projected backwards along the motion vector. Sub-pixel shifts can be achieved, using this method, by writing an interpolated value in the input picture into the buffer. This process is illustrated in FIG. 2.

Figure 3:
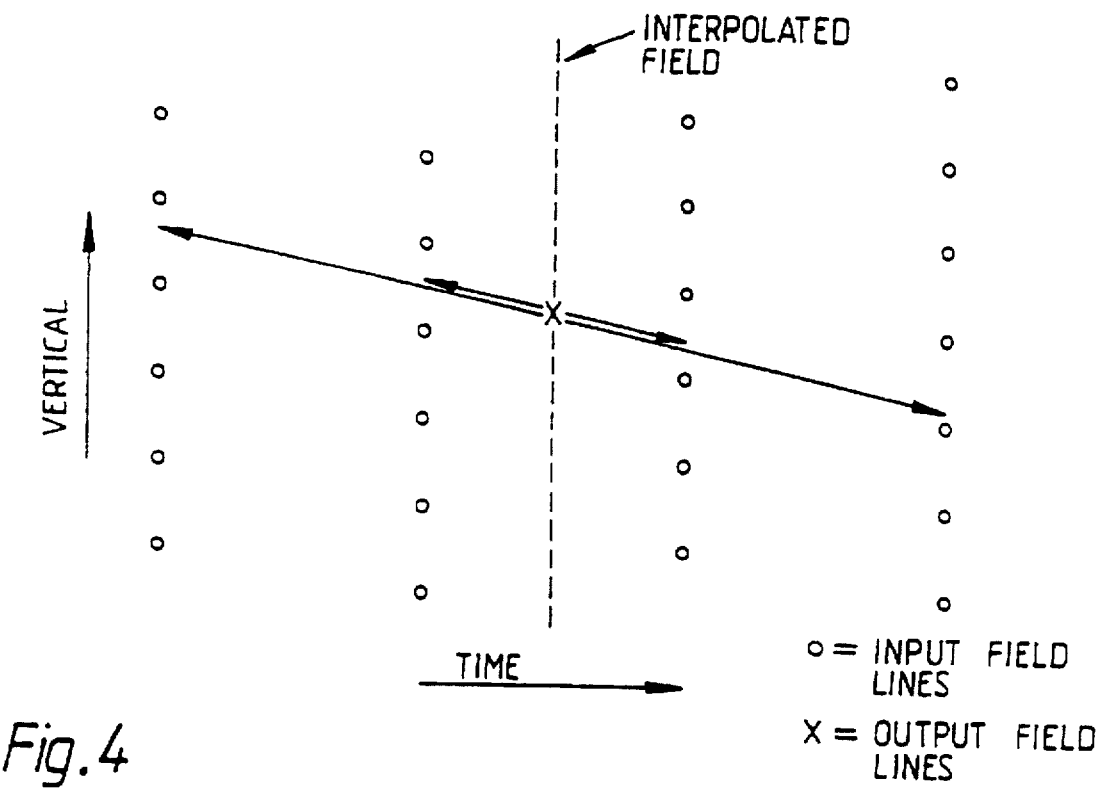
FIG. 3 is a diagram showing temporal interpolation in prior art motion compensated standards conversion.
Figure 4:
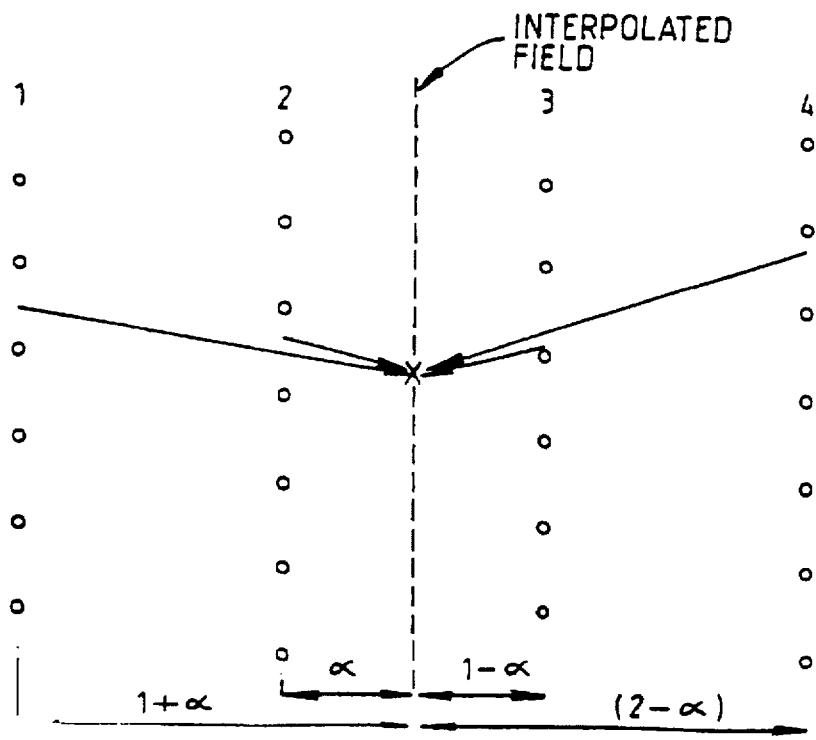
FIG. 4 is a diagram similar to FIG. 3, showing temporal interpolation in accordance with the present invention.

The difference between implementing motion compensation in the prior art manner and in accordance with the present invention is illustrated in FIGS. 3 and 4. In both cases contributions from four consecutive input fields are combined to generate each output pixel. FIG. 3 illustrates the prior art approach. In this case the motion vector, corresponding to the current output pixel, is scaled and added to the read pointer for each of four field stores. This gives a temporal interpolation along the motion trajectory.

Only one motion vector can correspond to each output pixel. Therefore the same vector is used in displacing each of the four fields. At the boundaries between moving objects there are areas of recently obscured or newly revealed background. The background and foreground objects will be moving with different velocities. Hence a single motion vector, as used when modifying the store's read pointer is not adequate for these areas of the pictures. In accordance with the present invention, the write, rather than the read, pointer is modified so that objects are displaced by vectors corresponding to input pixels. Hence different motion vectors will be used for the background and foreground objects as illustrated in FIG. 4. This greatly improves the interpolation of areas of revealed and obscured background and, therefore, the quality of the whole image.

Figure 5:
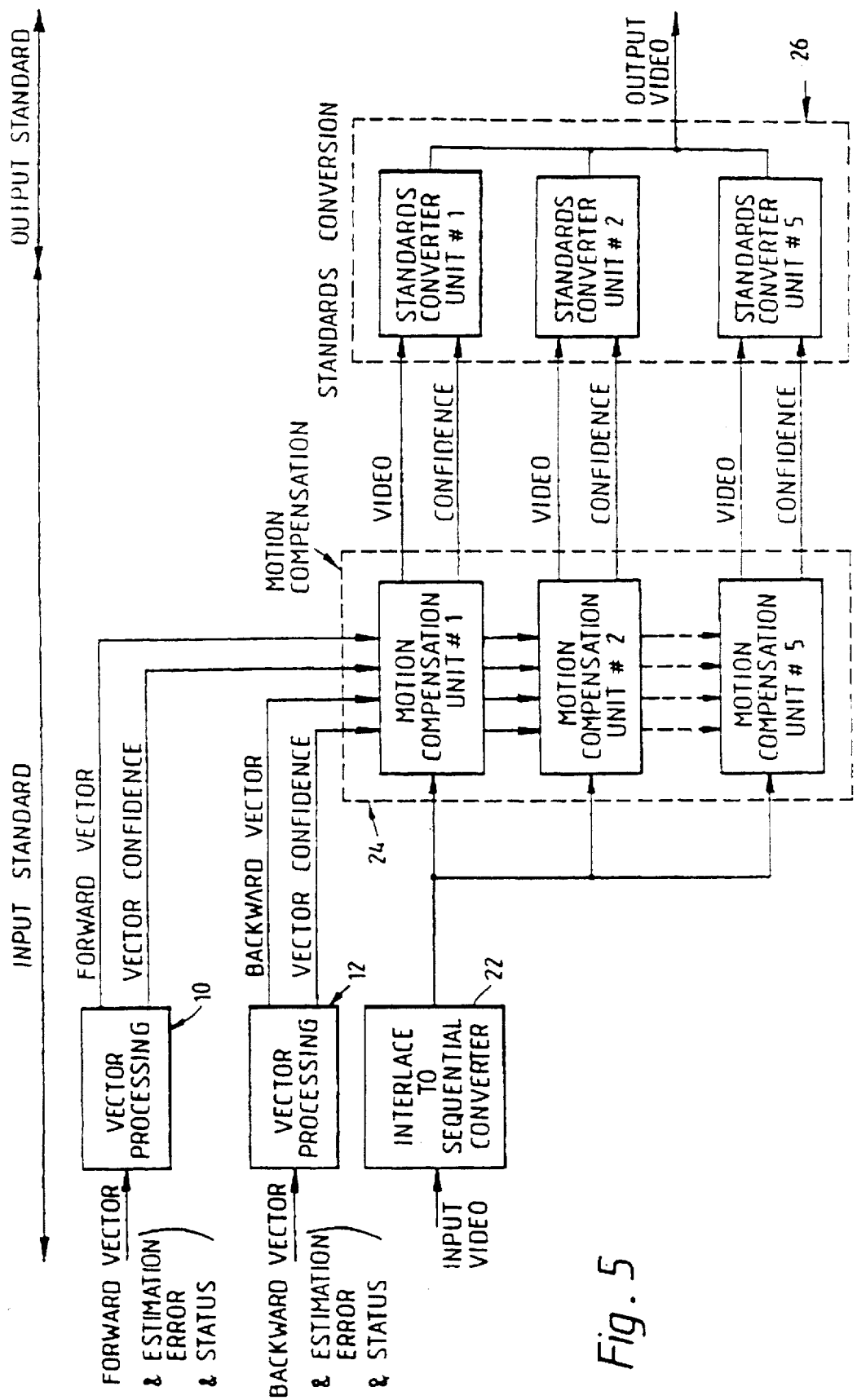
FIG. 5 is a block diagram of a motion compensated standards converter according to the present invention.

FIG. 5 illustrates an overall block diagram of the motion compensated standards converter. The input to the system is video scanned on the input standard, together with forward and backward pointing motion vectors corresponding to the pixels in input video signal. In addition to the two (forward and backward pointing) motion vector signals there is also an indication of how reliable the motion vector is. Furthermore there is a status flag for each vector indicating whether it corresponds to a foreground or background object. A motion estimator capable of deriving these motion vector signals is described in British Patent Specification, Application No. 9111348.0 although other motion estimation systems could be used.

The forward pointing motion vector is used for projecting objects forward in time along the motion trajectory, and vice versa for the backward pointing motion vector. Hence, in a four field standards converter, the forward vector is used for the earliest two fields in the interpolation aperture and the backward vector for the later two fields. The distinction between the forward and backward motion vectors arises because they are derived from considering forward or backward displaced frame difference signals. The displaced frame difference is only defined for a specific pixel if the corresponding pixel exists in the previous or subsequent frame. The forward and backward displaced frame differences are thus different, since backward difference is not defined for regions which have been newly revealed, and forward difference is not defined for regions about to be obscured. This difference is significant because it is directly related to regions of revealed or obscured background.

Figure 6:
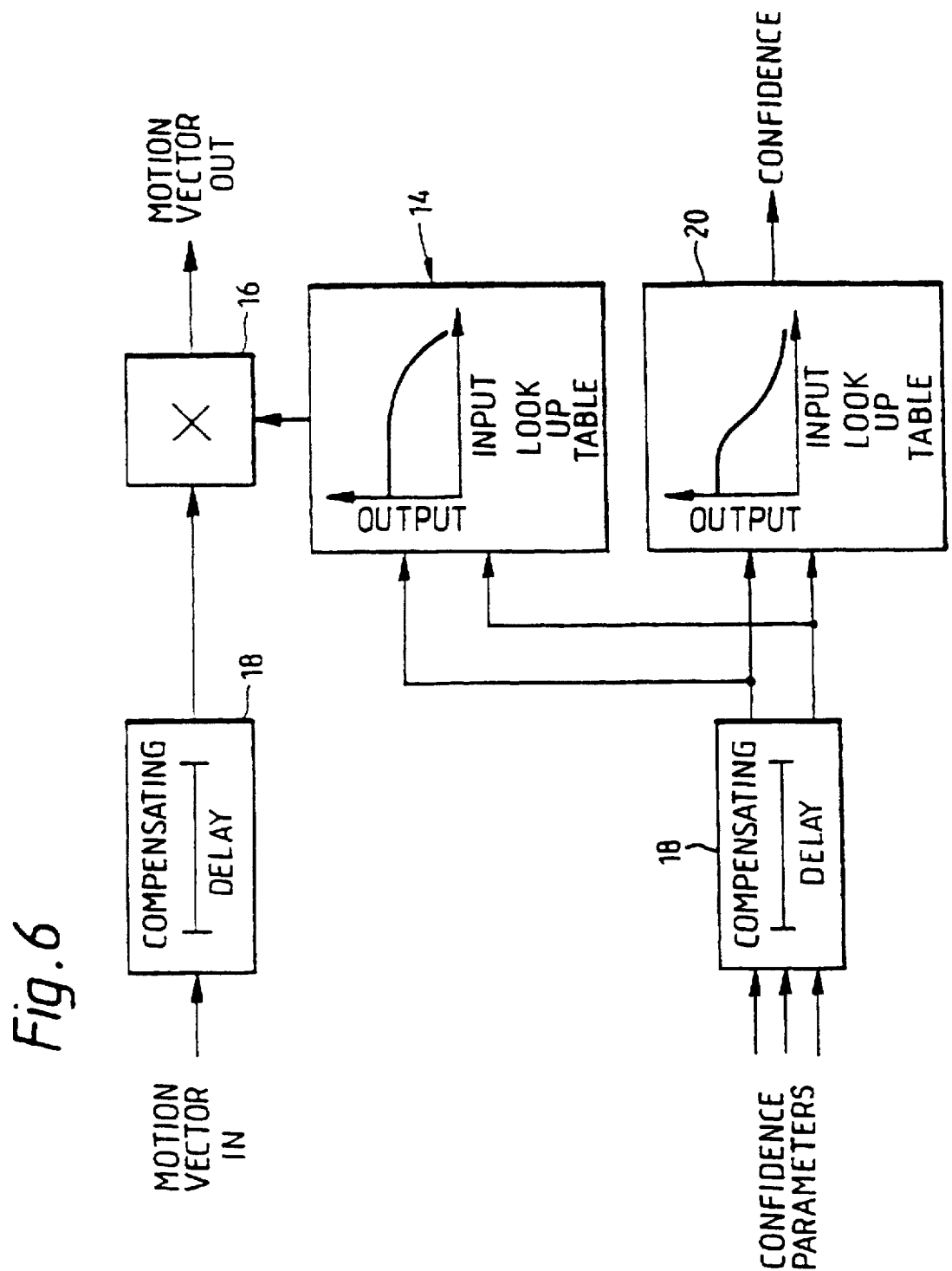
FIG. 6 is a diagram illustrating vector processing.

The motion vectors are processed in vector processing units 10,12 before they are used. The operation of these vector processing units is illustrated in FIG. 6. A measure of the confidence in the vector is derived from the 'vector estimation error' from the motion estimator. By passing the vector estimation error through a lookup table 14, the output from different types of motion estimator can be allowed for. The characteristic in the lookup table is as shown approximately in FIG. 6 and is adjusted empirically to suit the motion estimator. To improve further the robustness of the system to errors in motion estimation the motion vectors themselves may be scaled according to the confidence had in them. Thus a scaling factor relating to the vector error is taken from the lookup table 14 and applied to the motion vector in multiplier 16. When the motion estimator has a large estimation error there can be little confidence in the vector and the magnitude of the vector is reduced. This reduces the subjective effect of incorrect motion estimation since it is more objectionable to use a large incorrect vector than a small one.

A lookup table 20 provides a confidence value for use later in the process, from the vector estimation error and other confidence parameters such as the peak height. Compensating delays 18 ensure that timing is maintained with other parts of the apparatus.

Returning to FIG. 5, the standards converter itself consists of three parts, an interlace to sequential converter 22, motion estimation units 24 and standards conversion units 26. Motion estimation is performed by modifying the write pointer to a video store as described in the introduction. One of the advantages of this is that it allows motion compensation to be performed wholly on the input video standard. This avoids the need to standard convert the motion vectors to the output standards. Standards conversion of motion vectors is an awkward process which has been required, in previous implementations of motion compensated standards conversion. By avoiding the need for standards converting the motion vectors not only is the processing simplified but reliability is improved as well.

Interlace to sequential conversion of the input video is performed using a vertical-temporal filter. The aperture of the filter is not critical but an aperture of three fields by four field lines is suitable for this application. The function of interlace to sequential conversion is to improve spatial resolution and avoid temporal modulation of spatial aliasing at the output of the motion compensation part of the system. The frames that are produced for this purpose can be maintained throughout the subsequent standards conversion; alternatively a return can be made to interlaced field structure. In this particular example there is a return to field structure to reduce hardware requirements in the standards conversion. This feature of the invention is believed to be separately novel and inventive.

Motion compensation and standards conversion, in this system are split into a number of parallel processes. For the interconversion of European (50 Hz) and American (60 Hz) television standards five parallel paths are required. Different numbers of parallel paths could be used for different applications. Each standards conversion unit generates, in turn, one in five of the output fields. Each output field is constructed from four consecutive, motion compensated, input fields (more or less fields could be used in different applications). Each motion compensation unit generates, sequentially, the four motion compensated input fields required by one standards conversion unit.

Throughout the process of motion compensation and standards conversion a careful check is kept of the reliability of the motion vectors which are used. This reliability is indicated by the 'confidence' signals which flow through the system. Motion estimation required for standards conversion is a difficult process. Experience has shown that the results of motion estimation are not always correct. By keeping a check on the reliability of the motion vectors used the deleterious effects of motion estimation errors can be minimised.

Figure 7:
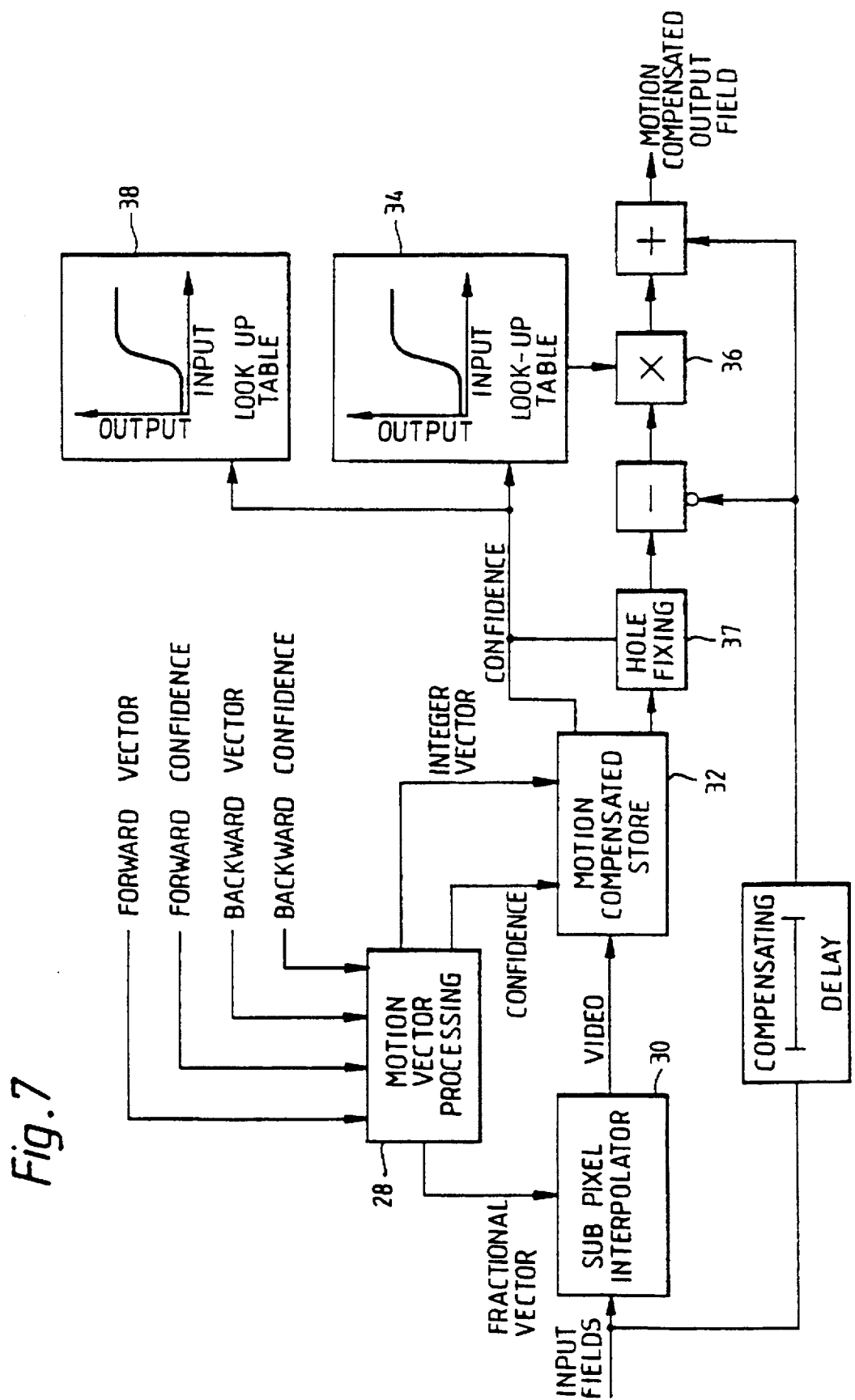
FIG. 7 is a block diagram of one of the motion compensation units of FIG. 5.

Motion compensation is performed wholly on the input standard, by modifying the write pointer to a video store, as indicated in FIG. 7. Sub-pixel shifts are implemented by spatial filter in sub-pixel interpolator 30 as described in the introduction and illustrated in FIG. 2. The aperture of the spatial interpolation filter is not critical and a size of two pixels by two field lines ( or four by three) is considered suitable for this application.

The integer part of the required displacements are implemented by adding the integer part of the motion vector— output from motion vector processing unit 28 to the write address of a motion compensation video store 32. The output of the store represents a basic motion compensated field.

There may, however, be parts of this motion compensated field which are unreliable or erroneous. This would arise either in regions of revealed background or because the motion vectors used were unreliable. This situation would be indicated by a low confidence output from the store. This output is taken to a lookup table 34 and provides a scaling factor to multiplier 36. If confidence output of the store is low then an appropriate fraction of the output is mixed with the input field. That is the system gradually falls back to state in which motion compensation is not used. The proportion of the basic motion compensated and input fields in the final output are controlled by the lookup table driven by the confidence signal. The characteristic of the lookup table is roughly as illustrated in the figure and is adjusted empirically to suit the motion estimator. Finally the confidence output, for the motion compensated field, from the motion compensation unit is derived via another lookup table 38.

The output from the motion compensated store 32 passes through hole filler 37 which is activated by the above-described hole flag within the confidence measure, to fill a hole through interpolation.

Figure 8:
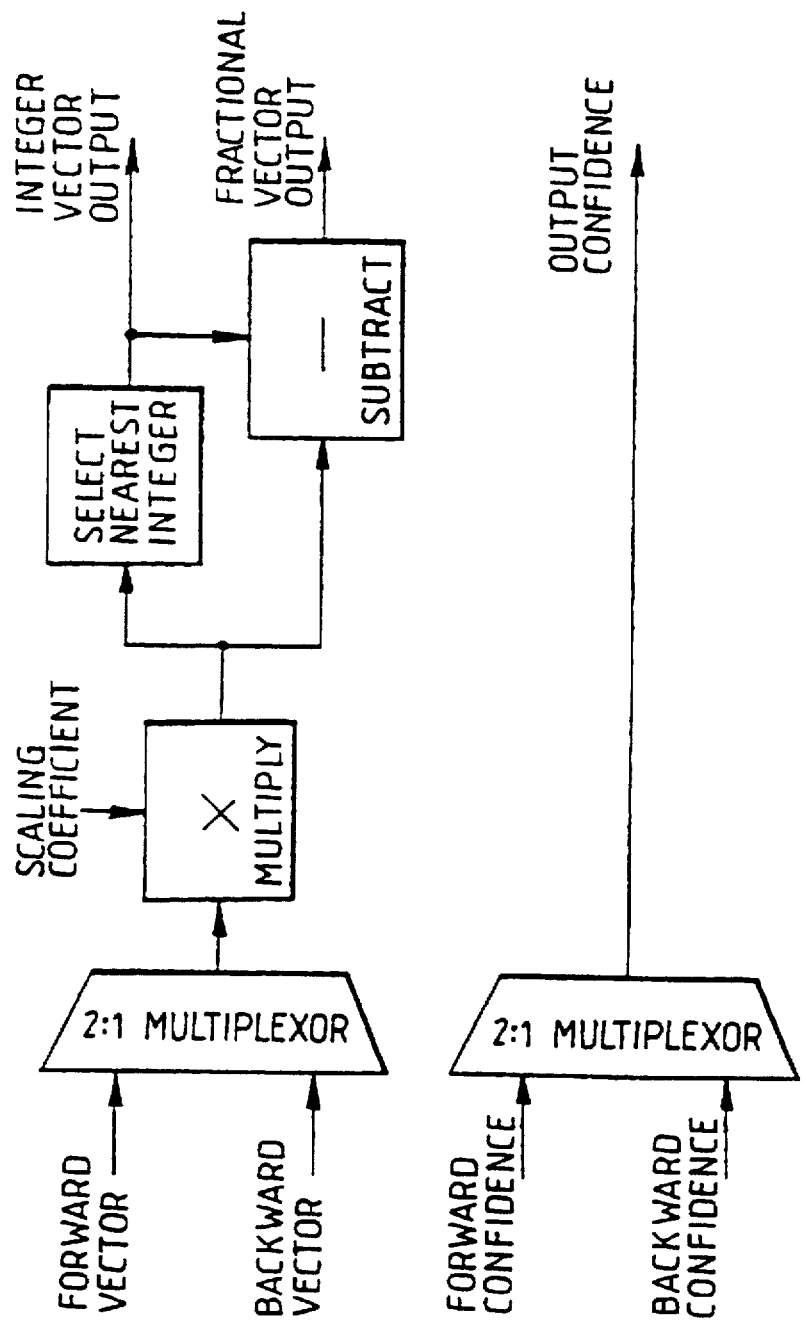
FIG. 8 is a diagram illustrating vector processing in the motion compensation units.

The vectors and confidence signals used by the sub-pixel interpolator 30 and motion compensated store 32 are derived as illustrated in FIG. 8. Forward vectors and confidence signals are used for the earliest two fields in the interpolation aperture while the backward vector and confidence is used for the later two fields. The motion vectors are scaled according to the position of the output field relative to the input field.

For example, for the earliest input field in the interpolation aperture a scaling factor of 1+ alpha would be used as illustrated in FIG. 4. Scaling factors of alpha, 1-alpha and 2-alpha would be used for the other fields as further illustrated in FIG. 4.

Figure 1:
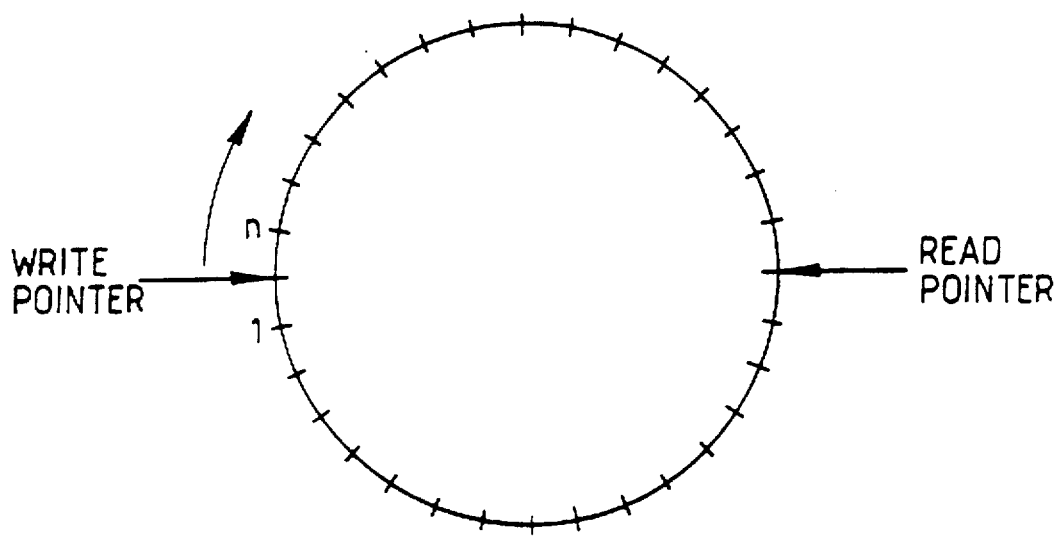
FIG. 1 is a diagram illustrating how variable delays, representative of motion vectors, can be introduced in accordance with the present invention.
Figure 9:
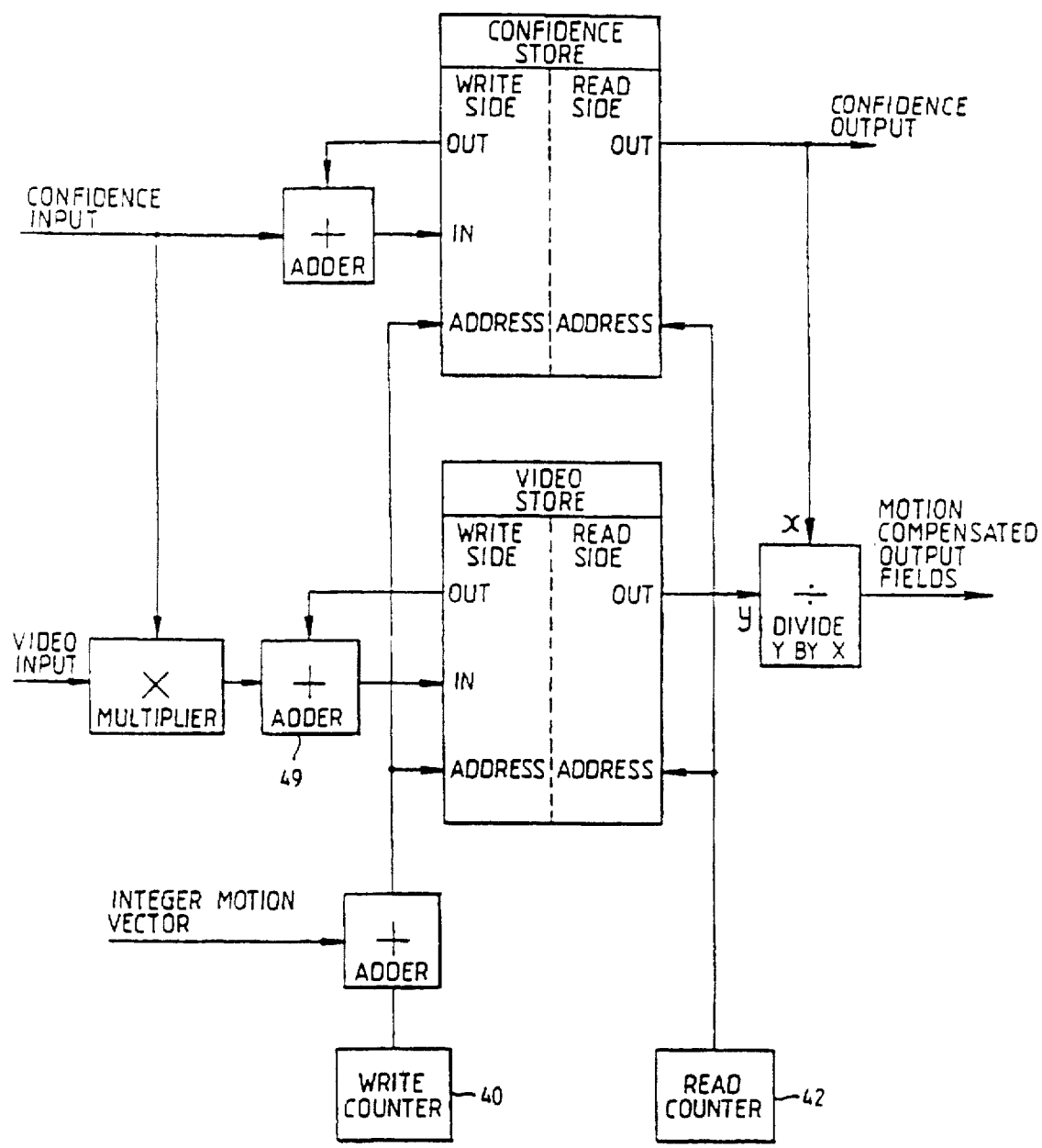
FIG. 9 is a block diagram of the motion compensated store shown in FIG. 7.

The motion compensated store 32 is illustrated in FIG. 9. As described earlier, the write address for the store is modified by adding the integer part of the motion vector to the output of the write counter 40 while the read counter 42 increments the read address in a regular progression. If the vector field converges in a part of the picture, corresponding to a region of obscure background, multiple input values will be written to the same output pixel. This is allowed for by accumulating the values written to each output pixel rather than merely retaining the most recently written. Hence the write side of the store actually implements a read-modify-write cycle using an adder 44 as shown in FIG. 9. The multiple accesses required to implement a read-modify-write cycle can be achieved by operating the store at twice the video sample rate. Read access to the store can occur in parallel to write access if the store is implemented as several physical devices (say four devices). This is possible because the read address is offset from the write address by approximately half the capacity of the store (see FIG. 1). If input values were merely accumulated in the video store brightness variations across the picture would result. Instead the input pixels are pre-scaled by the confidence value for the motion vector. At the output of the complete motion compensated store is divided by the accumulated confidence value (calculated in the 'confidence store'). This process ensures that the sum of the contributions to each output pixel always remains exactly unity. Hence there are no brightness variations across the output field.

Figure 10:
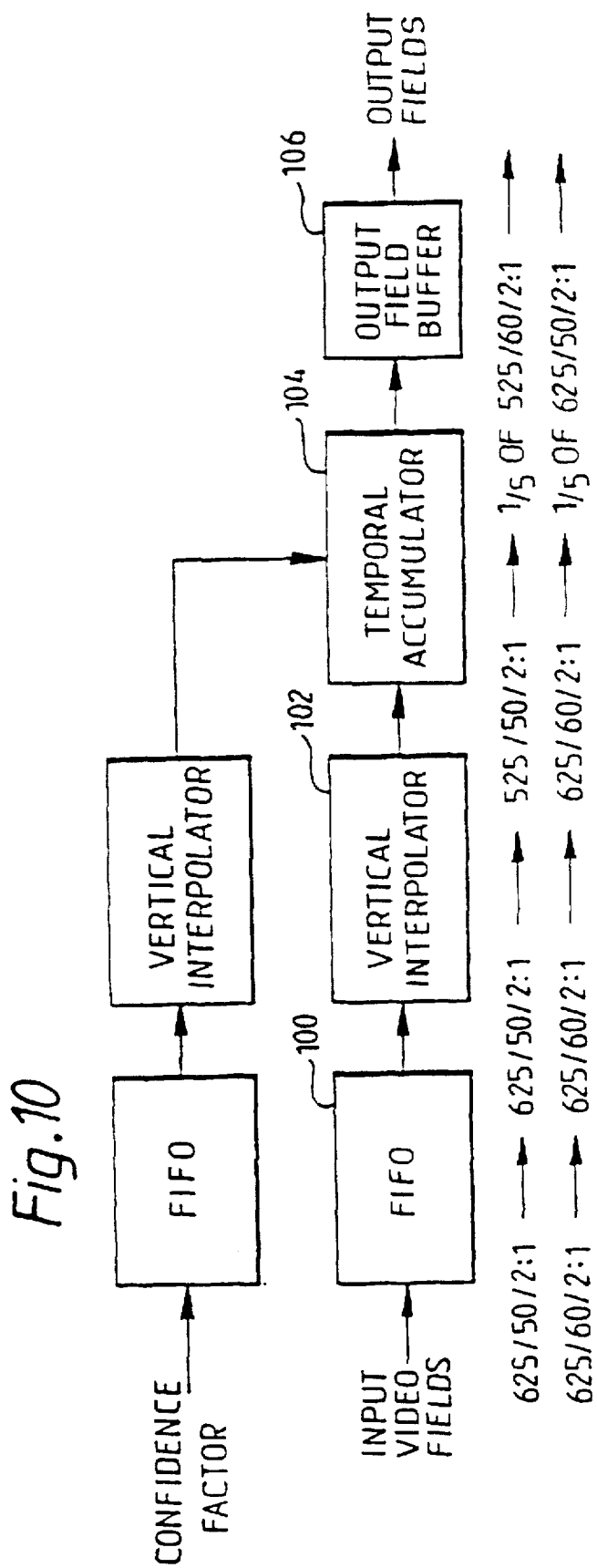
FIG. 10 is a block diagram of one of the standards converter units shown in FIG. 5.

The standards conversion process is illustrated in FIG. 10. It is largely based on the architecture of a non-motion compensated standards converter described in WO 90/03705. The standards converter comprises a FIFO buffer 100, a vertical interpolator 102, a temporal accumulator 104 and an output field buffer 106. This implementation has a modified temporal accumulation section to allow the vector confidence signal to be used. A output field buffer has been added. This has been done to allow the arithmetic part of the circuit to continue operating whilst the unit is outputting previously calculated results. This modification has become practical due to the dramatic reduction in the price of integrated circuit memory.

Figure 11:
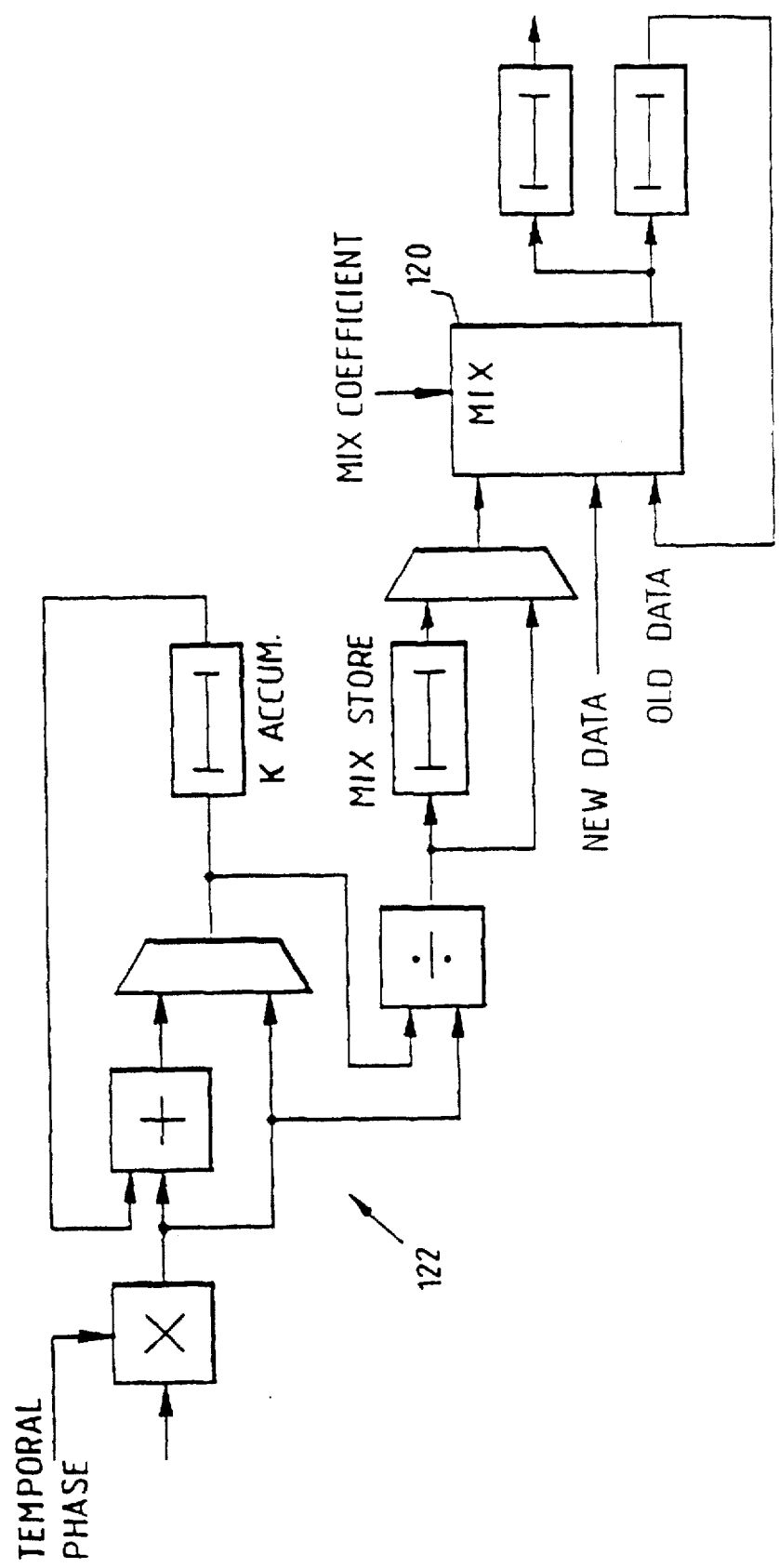
FIG. 11 is a block diagram of the temporal accumulator shown in FIG. 10.

The modified temporal accumulator is illustrated in FIG. 11. This accumulates the fields of partial results from the vertical filter on a five field cycle. Essentially the content of the accumulation process is cross faded with each new input so that the sum of contributions remains unity irrespective of the weighting of any individual contribution. This allows each contributing field to be weighted according to the confidence levels of the motion vectors used to construct it. The temporal aperture coefficient is used to weight the results from each field to perform temporal filtering. The operation of this circuit in one form can be illustrated by an example. Suppose that the temporal aperture coefficient and the vector confidence remain unity for all five fields. The sequence of values at point P is 1,1,1,1,1 while that at point Q is 1,2,3,4,5. The sequence of values at point R, which determines the proportion of the new input mixed into the accumulated result, is 1, ½, ⅓, ¼, ⅕. Hence the sum of the weights applied to the input of the temporal accumulator remains unity at all times. At the end of the five field cycle the sum of weights used in the accumulation process is always unity irrespective of the values taken by the confidence signal or the temporal aperture coefficient.

In a variation, account is taken of the fact that the aperture of a standards converter is desirably arranged to take predominantly high frequency information from the outermost fields. A preferred motion compensated standards converter according to this invention therefore interpolates fields in essentially two steps. First, the forward and backward pairs of fields are combined to form a forward field and a backward field. This combination takes into account the need to take predominantly high frequency information from the outermost field of each pair. Then, the forward and rearward fields are combined in a ratio which takes into account the temporal phase and the relative aggregate confidence values. The arrangement shown in FIG. 11 accomplishes this in the following manner.

The fields to be combined may be regarded as $F_1$ to $F_4$. In a first step, the mixer 120 receives $F_1$, as new data. In a second step, the new data of $F_2$ is added to the old data and an aggregate weighting value $k_2$ is stored. The value $k_2$ and the corresponding value $k_3$ for the other frame half, are processed in k network 122. This additionally derives the normalizing denominator $k_2+k_3$. In a third step, the new data $F_3$ is mixed with the old data with the appropriate weighting. Finally, the scaled new data $F_4$ is mixed with the old data. The result of these steps is to accumulate the value:

$$(F_1+F_2)\frac{k_2}{k_2+k_3} + (F_3+F_4)\frac{k_3}{k_2+k_3}$$

It should be understood that this invention has been described by way of example only and a wide variety of further modifications are possible without departing from the scope of the invention.

The invention claimed is:

1. A method of motion-compensated video processing, comprising the steps of identifying motion vectors, assigning said motion vectors substantially on a pixel-by pixel basis, and writing pixels of an input video signal to locations in a video store determined by the motion vector assigned to that pixel, wherein a confidence level is derived for each motion vector.

2. A method of motion-compensated video processing, comprising the steps of identifying motion vectors, deriving a confidence level for each motion vector, assigning said motion vectors substantially on a pixel-by-pixel basis, and writing pixels of an input video signal to locations in a video store determined by the motion vector assigned to that pixel, wherein pixels are accumulated with a weighting determined by the confidence level of the motion vector controlling the address to which the respective pixel is written.

3. A method according to claim 2, wherein each motion vector is scaled in relation to the confidence level.

4. A method of motion-compensated video processing, comprising the steps of identifying motion vectors, assigning said motion vectors substantially on a pixel-by pixel basis, and writing pixels of an input video signal to locations in a video store determined by the motion vector assigned to that pixel, wherein an interlace to sequential conversion is conducted prior to motion compensation.

5. A method of motion-compensated video processing, comprising the steps of identifying motion vectors, assigning said motion vectors substantially on a pixel-by-pixel basis, and writing pixels of an input video signal to locations in a video store determined by the motion vector assigned to that pixel, wherein an output pixel to which no data is written is flagged as a hole and is subsequently filled by interpolation.

6. A method of motion-compensated video processing, comprising the steps of identifying motion vectors, assigning said motion vectors substantially on a pixel-by-pixel basis writing pixels of an input video signal to associated locations in a video store determined by the motion vector assigned to that pixel and, in the case where more than one pixel is associated with a location in that video store, writing a combination of the pixels to the location in the video store.

7. A method according to claim 6, wherein the write side of the video store is operated in a read-modify-write cycle.

8. A method according to claim 6, wherein each motion vector is accompanied by a confidence level and wherein pixels are accumulated at a location in the video store with a weighting determined by the confidence level of the respective motion vectors.

9. A method according to claim 8, wherein the output of the video store is divided by the accumulated confidence level of motion vectors associated with the respective location.

10. A method according to claim 6, wherein any motion vector corresponding to non-integral pixel shifts, is divided into a sub-pixel vector component and an integral pixel vector component and wherein an interpolated pixel from the input video signal, related to the actual pixels in the input video signal through the sub-pixel vector component, is written to a location in the video store determined by the integral pixel vector component.

11. A method of motion-compensated video processing, comprising the steps of identifying motion vectors, assigning said motion vectors substantially on a pixel-by-pixel basis, writing pixels of an input video signal to locations in a video store determined by the motion vector assigned to that pixel to create motion compensated input fields F wherein an output field F is generated from at least four successive input fields $F_1$, $F_2$, $F_3$ and $F_4$.

12. A method according to claim 11, wherein an output field $F^{out}$ is created by combining motion compensated input fields $F_1$ and $F_2$ to create a forward field in which predominantly high frequency information is taken from field $F_1$; combining motion compensated input fields $F_3$ and $F_4$ to create a rearward field in which predominantly high frequency information is taken from field $F_4$; and combining said forward and rearward fields in a ratio which takes into account the temporal phase of output field $F^{out}$ relative to input fields $F_1$, $F_2$, $F_3$ and $F_4$.

13. A method according to claim 12, wherein each motion vector is accompanied by a confidence level; pixels are accumulated at a location in the video store with a weighting determined by the confidence level of the respective motion vectors; an aggregate confidence level is derived for each of the input fields $F_1$, $F_2$, $F_3$ and $F_4$; and wherein said forward and rearward fields are combined in a ratio which takes into account said aggregate confidence levels.

* * * * *

UNITED STATES PATENT AND TRADEMARK OFFICE
CERTIFICATE OF CORRECTION

PATENT NO. : 5,784,114
DATED : July 21, 1998
INVENTOR(S) : Philip D. MARTIN et al It is certified that error appears in the above-indentified patent and that said Letters Patent is hereby corrected as shown below:

On the cover sheet, under inventors, please replace "Timothy John Borer" with --Philip David Martin-- and "Philip David Martin" with --Timothy John Borer--
On the cover sheet, under assignee, please insert -- Snell and Wilcox Limited, Hampshire, England-- .

Signed and Sealed this

Twenty-third Day of March, 1999

Attest:

Q. TODD DICKINSON

*Attesting Officer*         *Acting Commissioner of Patents and Trademarks*